Figure 1:
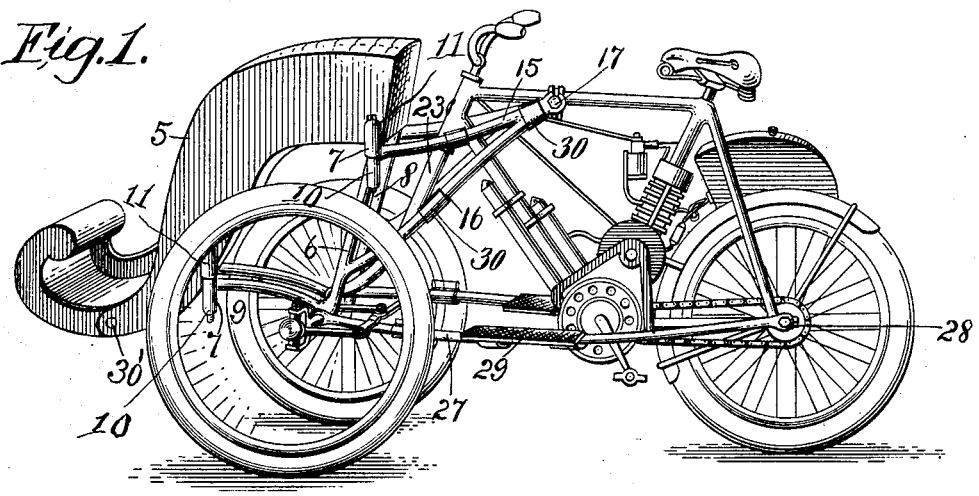

No. 891,102. PATENTED JUNE 16, 1908.
T. W. RAZOUX.
ATTACHMENT FOR MOTOR CYCLES.
APPLICATION FILED APR. 18, 1907.

2 SHEETS—SHEET 1.

WITNESSES
James P. Duhamel
Geo. Ackman Jr.

INVENTOR,
Theodore W. Razoux,
Victor J. Evans
ATTORNEY

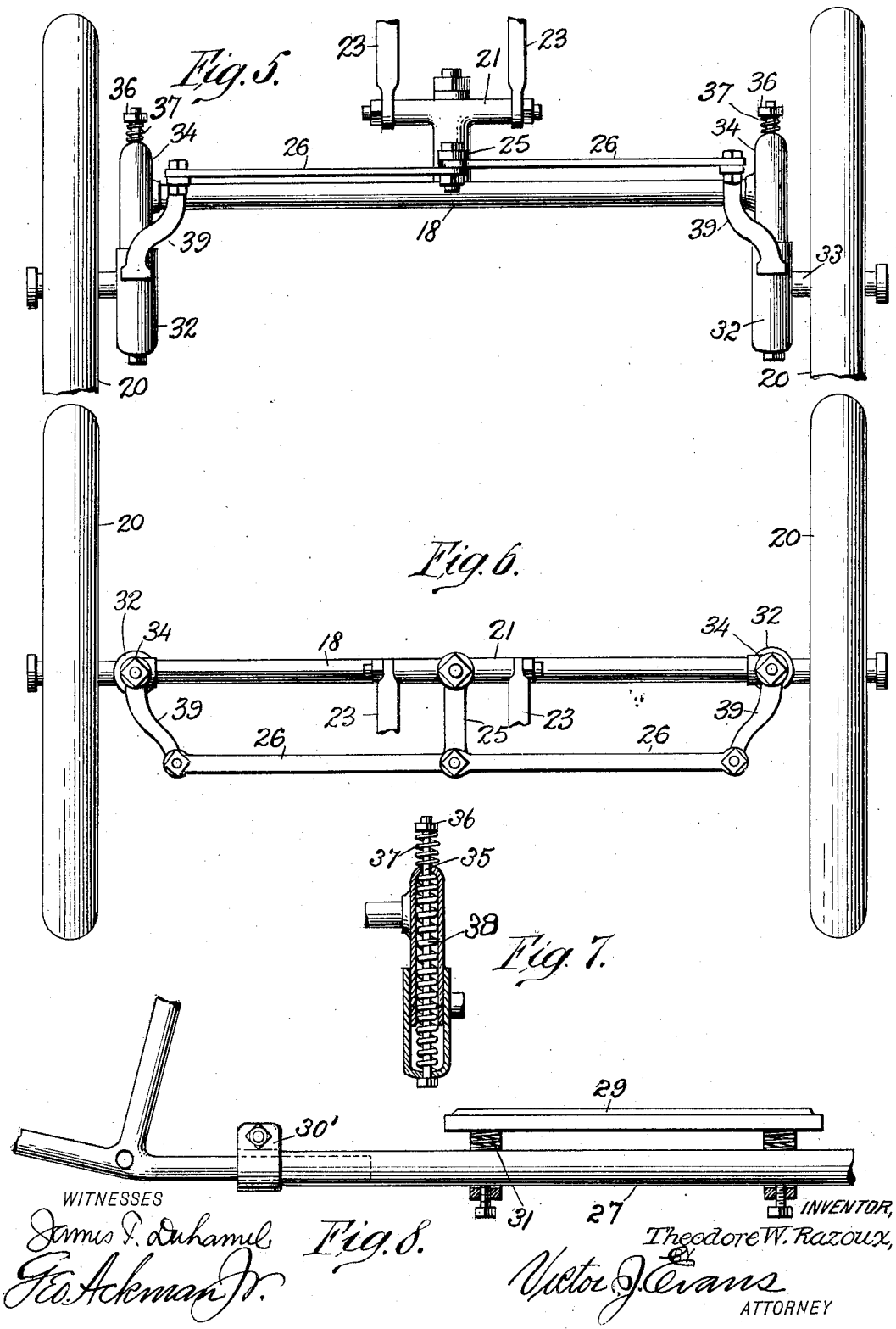

UNITED STATES PATENT OFFICE.

THEODORE W. RAZOUX, OF BROOKLYN, NEW YORK.

ATTACHMENT FOR MOTOR-CYCLES.

No. 891,102.  Specification of Letters Patent.  Patented June 16, 1908.

Application filed April 18, 1907. Serial No. 368,894.

*To all whom it may concern:*

Be it known that I, THEODORE W. RA-ZOUX, a citizen of the United States, residing at Brooklyn, in the county of Kings and State of New York, have invented new and useful Improvements in Attachments for Motor-Cycles, of which the following is a specification.

This invention relates to motor cycles and has for its object a supplemental attachment to receive the front fork of a two wheel motor cycle and which at the same time is provided with a seat and the necessary braces for securing the attachment to the motor cycle, as will be more fully described in the following specification set forth in the claims and illustrated in the accompanying drawings, where like reference numerals are used to designate the same parts in the various figures.

Figures 2, 4:
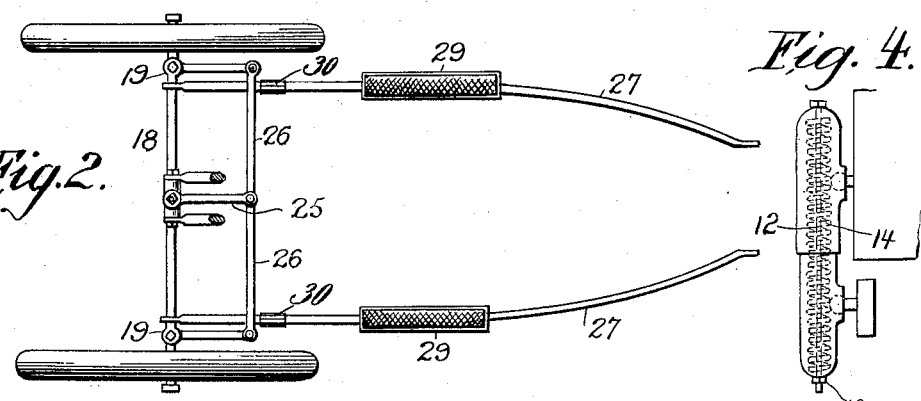
Figure 3:
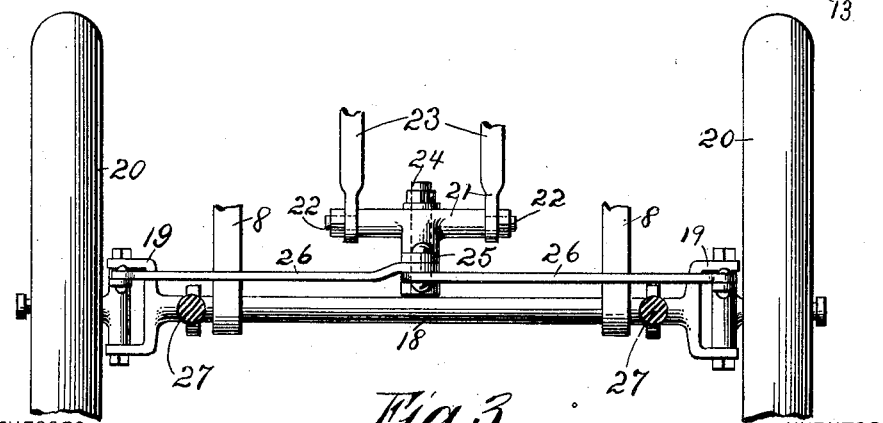

Figure 1 is a perspective view of a motor cycle embodying my improvements. Fig. 2 is a plan view of the attachment. Fig. 3 is a cross-sectional view showing the front axle.
Fig. 4 is a sectional view of a spring which is employed on the device. Figs. 5, 6 and 7 are views of modified details. Fig. 8 is an enlarged detail view of the side braces.

The attachment consists of a chair or a seat 5 preferably constructed for one person and is carried by a frame 6 having springs 7 interposed. The frame 6 consists of substantially upright members 8 and horizontal arms 9, at the end of both of these parts are cups 10 with openings at their lower ends and fitting over these cups are caps 11 carrying a central rod 12 which passes through the opening at the lower end of the cup 10 and is provided with an adjusting screw 13. Within this cup and its cap is a spring 14 which normally presses the cup and cap apart. These springs as thus arranged prevent any rocking or swinging of the seat as the motor cycle moves and the adjusting rod 12 provides for the regulation of the tension of the springs so that the proper resiliency may be arranged according to the weight of the occupant.

Extending rearward from the uprights 8 are braces 15 and 16 which unite at the bar running from the head to the seat post and is secured thereto by a bolt 17 of a clamp which is secured to said bar of the motorcycle. The lower end of the uprights 8 are perforated and through these perforations pass the front axle 18 which has at each end steering knuckles 19 carrying the wheels 20. This axle carries at its central point a T 21 having studs 22 which fit the perforations in the lower end of the fork 23 of the bicycle. This T 21 is pivoted on a post 24 and has a rearwardly extending arm 25 to which are connected the links 26 that are also attached to the steering knuckles so that when the fork of the bicycle which is secrued to the T is turned the wheels are diverted to their proper direction. To the attachment are secured in any suitable manner the side braces 27 which extend rearwardly to the axle of the rear wheel and are secured to same or the rear framework. They are in two parts and telescopic so that the adjustment of the rear wheel is not hindered and the two parts are rigidly secured together by clips or the pinch binders 30 which permit of their variation in length. These braces are provided with foot-rests 29 having springs 31 interposed between them and the braces to relieve the shock produced by the movement of the cycle. The front end of the seat 5 is hinged at 30' so that the same may be folded back and the attachment will take up little room after braces 27 are removed.

When it is desired to transform the two wheel motor-cycle into a tri-car and an additional seat the front wheel is removed from the fork and the latter is fitted upon the T of the axle 18 and bolted thereon and the braces 15 and 16 are also secured and the braces 27 attached to the rear frame or axle. These braces form a rigid and economical means for securing the attachment to the motor-cycle and in consequence of the adjustable nature of the braces the attachment may be secured to any of the various types of machines made and affords a substantial addition besides being quickly and easily removed when so desired.

In the modified forms of the springs shown in Figs. 5, 6 and 7 the springs supporting the attachment become a part of the steering knuckles and from the lower member or cup 32 project laterally the axle studs 33 on which the wheels are journaled and the axle 18 carries at each end a coöperating cup 34 which telescopes in the cup 32. The rod 35 is headed at its lower end and is threaded at its upper end and provided with the nut 36, between which and the cup 34 is interposed a spring 37 to hold the rod firm when the cups telescope. The cups 32 are also provided with crank arms 39 which are connected with the arm 25. Within the cups and under tension when the seat is occupied is a spring 38 which surrounds the rod 35. These springs afford a resiliency for the whole attachment and the front fork of the cycle, and provide a more economical arrangement of springs than above described.

The object of this invention is to convert a motor-cycle into a tri-car in a few moments and to provide a light and small attachment which may be stored in a limited space by folding up the foot rest and removing the braces. These operations may be performed by a person with little mechanical experience.

It is obvious that other modifications of the details may be resorted to without departing from the essential features above described.

What I claim as new and desire to secure by Letters Patent is:

1. In an attachment for motor-cycles, the combination with a forwardly extending rotating fork, of an axle having means for attaching the fork, a seat carried by the axle and braces connecting the axle with the frame of the machine.

2. In an attachment for motor-cycles, the combination with the front fork of the machine, of an axle carrying steering-knuckles, a cross bar pivoted to the axle and to which the fork is secured, an arm projecting from the cross-bar and links connecting the arm with the steering knuckles.

3. In an attachment for motor-cycles, the combination with an axle carrying wheels and adapted to be pivotally attached to the fork of the machine, steering-knuckles carried by the axle and means connecting the steering knuckles with the fork of the machine.

4. In an attachment for motor-cycles, the combination with a stationary axle carrying steering knuckles, means for pivoting the fork of the machine to the axle, arms supported by the axle and adapted to carry a seat, springs interposed between the seat and the arms, braces connecting the arms with the frame of the machine, braces connecting the attachment with the rear frame of the machine or rear axle of said machine, and links connecting the fork with the steering knuckles and adapted to turn them.

5. In an attachment for motor-cycles, the combination with a stationary axle, of steering knuckles, a seat, adjustable springs interposed between the steering knuckles and the seat, means for securing the front fork of the motor-cycle to the axle and means connecting the fork with the steering knuckles.

6. In an attachment for motor cycles, the combination with a seat, of an axle, steering knuckles connected with the axle and carrying wheels, cups containing adjustable springs and interposed between the seat and the steering knuckles, and adjustable braces connecting the attachment with the rear part of the frame of the motor cycle near the rear wheel.

7. In an attachment for motor cycles, the combination with a seat, of an axle, steering knuckles at the ends of the axle and carrying the wheels, adjustable springs between the wheels and the axle of the attachment, means for preventing lateral movement of the springs, adjustable braces connecting the attachment with the rear part of the frame near or at the axle of the rear wheel of the motor cycle, locking means on the braces and yielding foot rests on the braces.

8. In an attachment for motor cycles, the combination with a seat, braces securing same to the frame of the motor cycle, adjusting means for the braces, an axle carrying the front fork of the motor cycle, an inverted cup at each end of the axle, steering knuckles carrying the wheels and having cups, springs interposed between the cup of the steering knuckles and those of the axle, means for varying the tension of the springs in the cups, means connecting the front fork with the steering knuckles and resilient foot rests.

9. In an attachment for motor cycles, the combination with a seat, of an axle adapted to carry the front fork of the motor cycle, means for attaching the fork to the axle, inverted cups on the ends of the axle, coöperating cups with studs for the wheels, crank arms on the latter cups, a spring interposed between the coöperating cups, a rod passing through the same, adjusting means on the rod and means connecting the front fork with the crank arms to change the direction of the wheels.

In testimony whereof, I affix my signature in presence of two witnesses.

THEODORE W. RAZOUX.

Witnesses:
   JAMES F. DUHAMEL,
   MAE W. CLINTON.